United States Patent [19]

Switsen

[11] Patent Number: 4,543,608
[45] Date of Patent: Sep. 24, 1985

[54] VIDEO TAPE RECORDER R.F. SIGNAL PROCESSOR

[76] Inventor: Henry N. Switsen, 17236 Bircher St., Granada Hills, Calif. 91344

[21] Appl. No.: 453,595

[22] Filed: Dec. 27, 1982

Related U.S. Application Data

[63] Continuation-in-part of Ser. No. 347,339, Feb. 9, 1982, Pat. No. 4,467,358.

[51] Int. Cl.$^4$ .......................... H04N 5/08; H04N 5/76
[52] U.S. Cl. .................................... 358/153; 358/148; 358/319; 358/320; 358/337; 358/22; 360/36.1; 332/48

[58] Field of Search ................... 358/21 R, 22, 23, 37, 358/36, 27, 149, 148, 153, 155, 159, 166, 310, 315, 319, 320, 335, 337, 158; 332/37 R, 38, 48, 40, 17, 18; 360/36.1

[56] References Cited

U.S. PATENT DOCUMENTS 3,758,711  9/1973  Crosno ................................ 358/149
4,099,204  7/1978  Lowe et al. ......................... 358/149

Primary Examiner—John C. Martin
Assistant Examiner—Michael D. Parker

[57] ABSTRACT

A circuit for changing or improving the picture characteristics or quality sent from home consumer video tape recorders to television receivers by processing the radio frequency signals feeding such receivers after they have left the video tape recorder.

6 Claims, 8 Drawing Figures

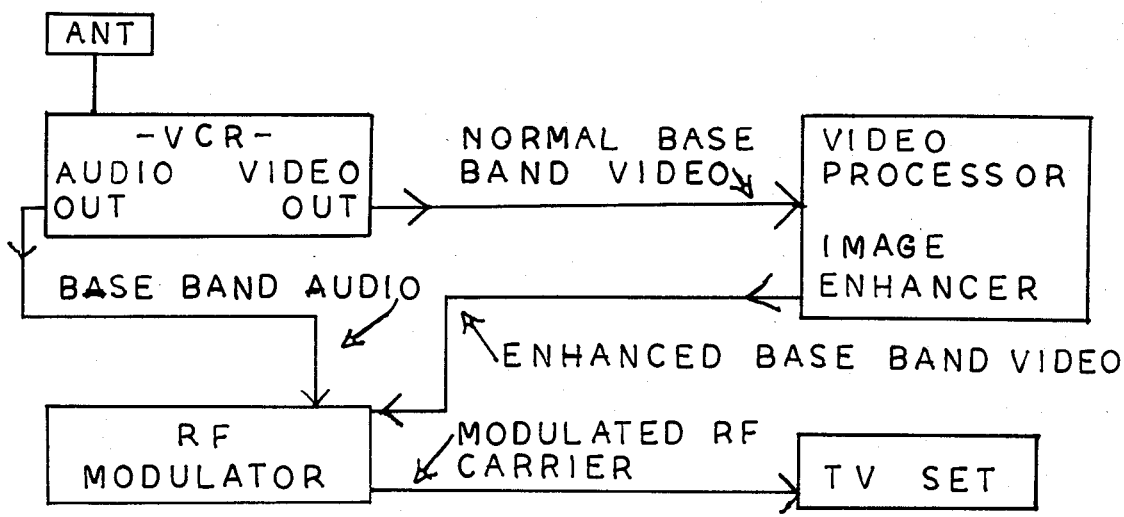
FIGURE 1-PRIOR ART
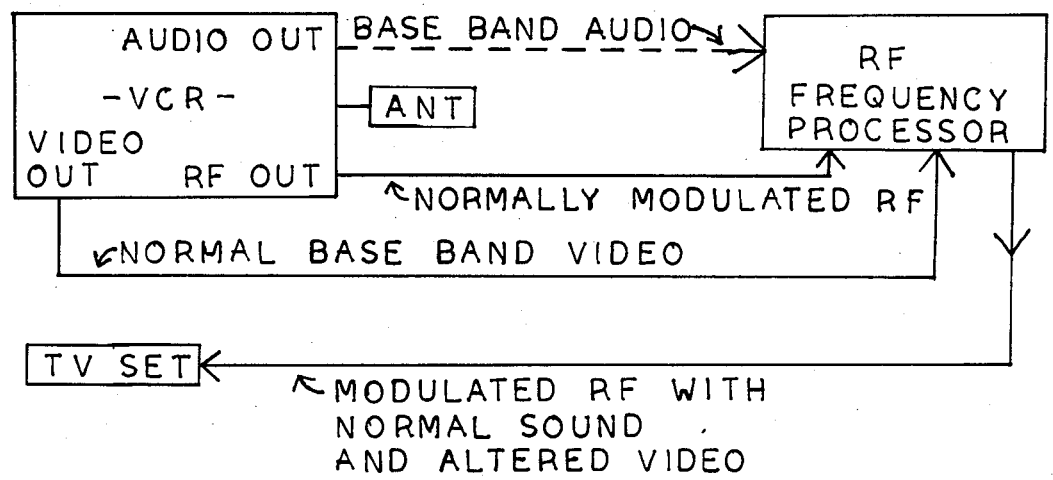
FIGURE 2
FIGURE 6A
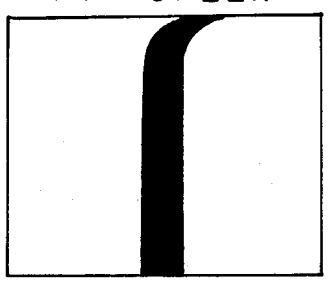
"BEFORE" TV SCREEN
FIGURE 6B
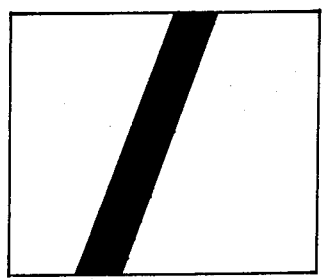
"AFTER" BUT OUT OF ADJUSTMENT
FIGURE 6C
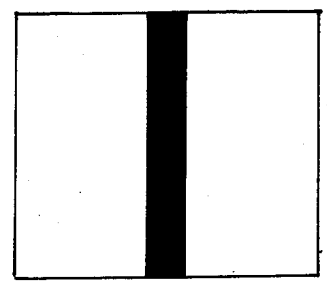
"AFTER" CORRECTLY ADJUSTED

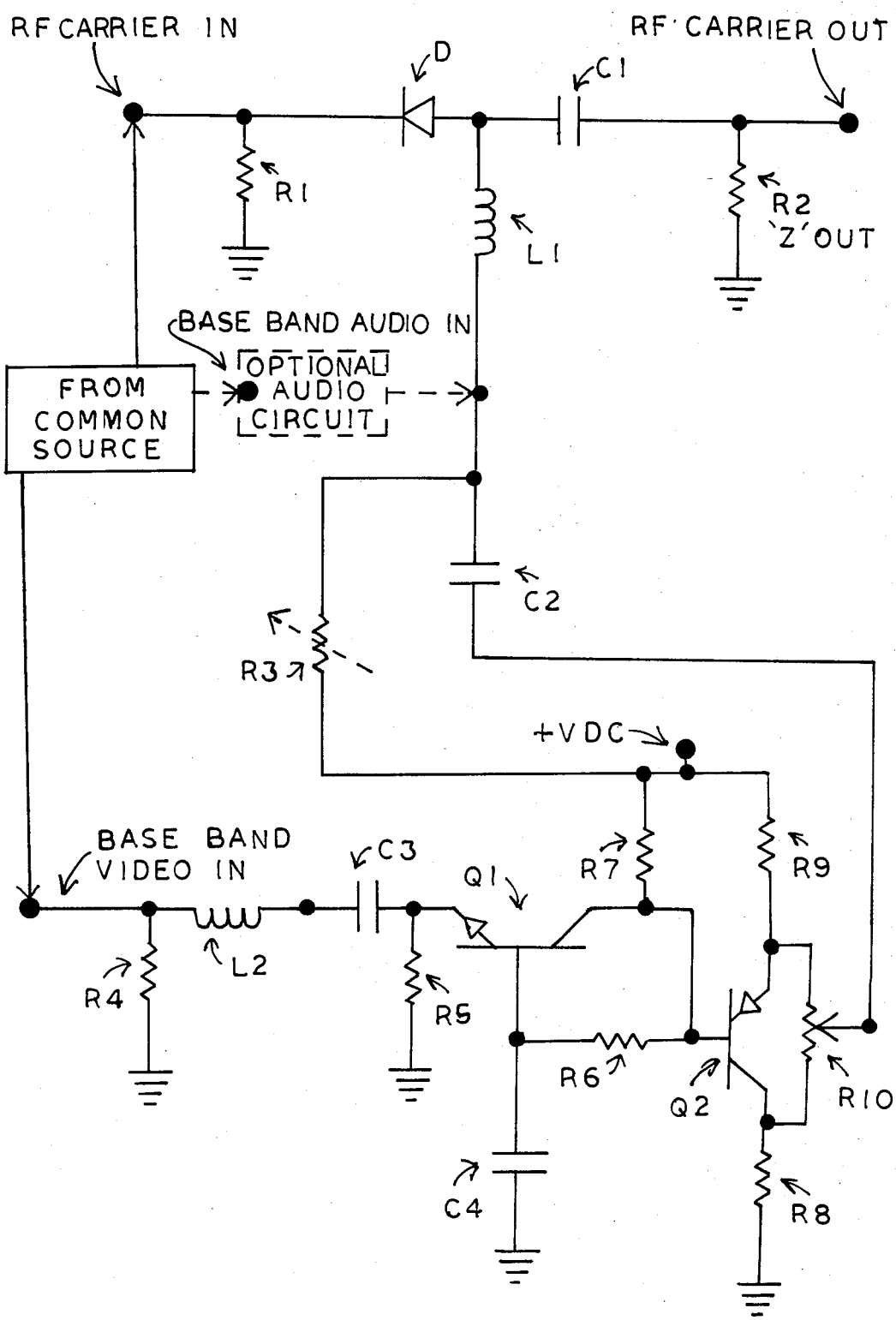

VIDEO TAPE RECORDER R.F. SIGNAL PROCESSOR

CROSS REFERENCE TO RELATED APPLICATION

This is a continuation-in-part of patent application Ser. No. 347,339 filed, Feb. 9, 1982 now U.S. Pat. No. 4,467,358.

BACKGROUND OF THE INVENTION

Most home consumer type vido tape recorders will lose definition or "detail", (high frequency response) when playing back tape recordings made on them. This is especialy true when these machines are used in their "long play" modes.

Many other factors play a part in reducing "detail" in viewed pictures, even "live" pictures, such as deteriorated alignment of the television set with age, defective parts in the television set causing poor detail, but not enough so as to prompt the consumer to call a repair technician, poor quality braodcast from the studio, perhaps because of poor quality "originals" or other reasons, antennas and antenna lines causing loss of detail on some or all channels, just to mention a few. The list of all possible causes of loss of "detail" would be a long one indeed.

Obviously, means to either restore lost detail, or "enhance" existing detail in viewed images would be of great benefit to the viewer.

Further, in addition to simple detail enhancement of reproduced pictures, many home consumers would like to experiment with a broad area of "video art" or "special effects", but have been unable to do so in the past because of the prohibitively high cost of the electronic equipment required. The present invention will make available this "video art", or "special effects" capability to the average video tape recorder owner.

DESCRIPTION OF THE PRIOR ART

A typical "image enhancer" in present usage might use an equipment set up similar to that shown in FIG. 1.

The antenna connects first to the video tape recorder, where a program can be selected by the tuner associated with the V.C.R. A recording can also be made at this time if desired. The program signals selected by the V.C.R. either "live" or tape playback, will simultaneously appear at the audio and video output jacks of the V.C.R. From there, the audio signal is cabled to an R.F. modulator to be modulated up to radio frequencies (R.F) to be heard on the television set. The normal base band video signal is routed into a video signal processor, or "image enhancer", where it is processed, or enhanced, and is then sent on to the R.F. modulator, also to be modulated up to R.F. frequencies for viewing on the television set.

These R.F. modulators, along with their interface and power supplies add substantially to the cost of the enhancing system, as the R.F. modulators of the kind needed for the task, (requiring government approval also) must be very carefully designed, shielded, and also adjusted to exact settings and tolerances to not only modulate accurately normal video and sound information, but *enhanced* video as well.

Any deficiency in the modulator design or adjustment would degrade the entire enhancing system. Such well designed and carefully calibrated R.F. modulators often cost more than the base band video processor itself.

Obviously if such modulators could be eliminated from the total system, a tremendous savings in cost of manufacture could be realized, and that is the essence of the present invention.

SUMMARY OF THE INVENTION

In accordance with one embodiment of the present invention, use is made of the R.F. modulator *already* present in all home consumer type video tape recorders.

In the prior art designs, these modulators had to be manufactured, while the tape machine's inbuilt modulators were bypassed and not used. In spite of the fact that these inbuilt modulators were very well designed, shielded and calibrated, they lay dormant and unused.

In this embodiment of the present invention, the "interface" of the base band video and audio circuitry (level and bias settings) as well as the 4.5 megacycle audio modulating circuitry is unnecessary, and indeed, even the entire added R.F. modulator itself is gone, realizing a very significant cost reduction.

BRIEF DESCRIPTION OF THE DRAWINGS

FIG. 1 is a block diagram of a typical prior art enhancement system.

FIG. 2 is a block diagram of a system constructed in accordance with one embodiment of the present invention.

FIG. 3 is a schematic drawing of an enhancer circuit which acts on the R.F. carrier.

FIGS. 6A, 6B and 6C show three views of a television set both before and after being acted upon by the embodiment disclosed in FIG. 5.

DESCRIPTION OF THE PREFERRED EMBODIMENT

Figure 4:
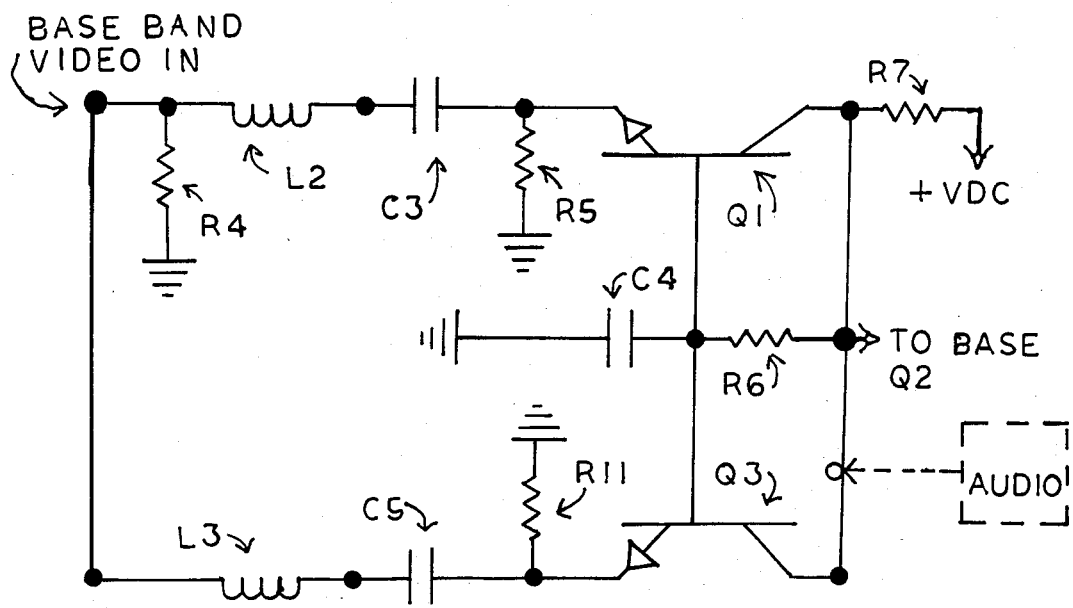
FIG. 4 is a partially repeated section of FIG. 3 showing a simple method to expand the capability of FIG. 3.

FIG. 2 shows a block diagram of one embodiment of the present invention. The base band video is extracted from the VCR and processed as desired.

Now however, because the base band video and the R.F. carrier signals come from the same source, that is the VCR machine *itself*, they are constantly timed, and in constant phase with each other.

This makes it now possible therefore to not pass the processed base band video signal to another and separate R.F. modulator as in the prior art systems, but to instead feed the processed video back to circuitry which acts on the high quality R.F. carrier *already available* from the VCR itself.

The simple circuitry required to act on the R.F. carrier is shown in FIG. 3 its principle of operation is as follows.

Television video signals are amplitude modulated wave signals, and that means that as the instantaneous level of the R.F. carrier changes up or down, the demodulated video signal inside the television set changes right in step with the level of the R.F. carrier.

At any given instant, the value of the demodulated video signal voltage is either rising, falling, or remaining stationary depending on whether amplitude of the R.F. carrier is rising, falling or remaining stationary at that same instant in time.

If at a particular instant in time a bit of "fine detail" information was being received, then the R.F. carrier would change levels very quickly, (either up or down), and the amplitude of the level change would determine the amplitude of the "fine detail" bit of information.

Speed of R.F. level change determines frequency, and the amount of this level change determines the amplitude of this same frequency.

FIG. 3 shows the R.F. carrier from the VCR entering the circuit at "R.F. carrier in". R1 is a terminating impedance to insure a D.C. current. The value of R3 together with the voltate value of plus VDC sets a D.C. current through the diode D which may be typically a linear value around one half milliampere. This D.C. current is passed through R.F. blocking inductor L1. This will set a fixed impedance in diode D of say approximately 75 ohms. If R2 is 75 ohms, or a suitable L-C network, or reactive impedance, (of course, the "load" of the television set is also present but for explanational purposes can be ignored), then the signal reaching "R.F. carrier out" will be 50% of the R.F. signal at "R.F. carrier in". This is a "fixed" or "bias" level of 50% and all amplitudes of all frequencies will be reduced to 50% as they pass from "R.F. carrier in" to "R.F. carrier out".

If at a particular instant of time, an R.F. signal was passing through diode D which contained a "fine detail" bit of information, then the R.F. signal at "R.F. carrier in" would be changing amplitude quickly. If at the same instant in time a processed base band video signal arrived at diode D through capacitor C2 and L1, it would then change the current through diode D, and so would also change the impedance of diode D at this same instant in time.

If the fine detail bit of R.F. information at this particular instant was a "decreasing R.F. amplitude" bit, and the base band processed video signal reaching diode D was also negative going at the same instant, then the bias current of diode D would likewise drop, and its impedance would go up, causing more than a 50% loss ratio to occur passing diode D, and the overall effect would be a greater than normal amplitude drop in the R.F. carrier level reaching "R.F. carrier out". This particular bit of "fine detail" information will have been *enhanced.*

Of course, the same holds true for the reversed polarity of signals. A "fine detail" bit of increasing amplitude R.F. information will likewise be enhanced if accompanied by a positive going current from the "processed video in" circuitry.

Also, note that although the very simple and economical circuit described does have an "insertion loss" associated with it, the automatic gain control circuits within the television receiver will readily adjust the receiver gain to compensate for this. Even so, if insertion loss is undesirable, a "gain controlled" amplifier could be substituted for the diode D of FIG. 3 and this could be designed for unity gain, or possibily even designed with substantial gain so a product could be manufactured as a "Booster-Enhancer", a very attractive product from a marketing and profit stand point.

Referring again to FIG. 3 normal base band video enters the circuitry at the junction of terminating resistor R4 and L2. L2 and C3 form a simple L-C bandpass filter, and by proper choice of values for L2 and C3, can select the desired "slice" of the base band video signal spectrum to be amplified by NPN transistor Q1. Resistor R5, and the use of a "common base amplifier" configuration for Q1, easily provides more than ample "Q" values for L2-C3 to make a very effective band pass filter. Indeed, some common commercially available inductors tried in the circuit of FIG. 3, (18 micro henries with 220 pico farads) actually required a "damping" resistor to be placed in series or parallel with L2 to lower its "Q" and widen the band pass of the circuit.

Q1 is biased by load resistor R7 and biasing resistor R6. The base of Q1 is bypassed by C4, and thus Q1 amplifies the signals selected by L2-C3, and then passes them on to Q2 which can be a second amplifier by choice of resistors R8 and R9 of appropriate values. (In such a case R8 and R9 could also be by-passed, or contain additional filter elements). Q2 could of course, be omitted entirely, and then R10 would then connect directly to the Q1 collector.

In FIG. 3 however, Q2 is shown as a simple phase splitter, to allow R10 to select opposite polarity signals to be passed on to coupling capacitor C2. C2 and L1 could also be another filtering element, and indeed one need only make the value of C2 small, to turn it into a "high pass" filter. A typical value of C2 might be 1000 pico farads. Thus the final "processed" base band video signal would appear at the junction of diode D and L1 of FIG. 3, and act on diode D as previously described.

FIG. 4 shows R4, L2, C3, R5, Q1, C4, R7 and R6 of FIG. 3 repeated, and new elements L3, C5, R11 and Q3, to illustrate how easily the circuit of FIG. 3 lends itself to expansion of additional band pass amplifiers, (audio or video) and each could have individual gain controls to amplify their respective pass-bands by varying amounts.

In another embodiment of the present invention, with reference to FIG. 3, the fixed bias resistor R3 may be made "user adjustable" to change the bias of diode D from a linear operating point, to a non linear point, which can then create some very startling "video art" or special effects.

With reference to FIG. 3 and FIG. 4, by making R3, R10, R6, R7, R8 and R9 user adjustable controls to allow for phase inversions, amplifer saturation, amplifier cutoff, clipping and compression, and general non-linear operations, a completely limitless horizon for new and exciting "video art" can be created, especially when combined with other amplifiers (such as Q3 of FIG. 4) connected so that the chroma signal can be made to act on the luminance signal and vice versa in many different ways of amplitude and polarity shifts, and all at very low cost of manufacturing, far below the cost of any prior art approach and especially so in the area of video art.

The important point, and in fact, the essence of the present invention is the presence of an already generated high quality R.F. carrier and the presence of an already available high quality base band video signal which are constantly timed to each. Both of which are already available at connector jacks to the consumer if they own a video tape recorder, and therefore, need not be manufactured separately, thus realizing tremendous cost reductions over any prior art systems.

As a way of illustration of a modification and variation of the present invention, the base band video process circuitry could feed appropriate signals to diode D of FIG. 3 during "chroma burst time" to vary the color level amplitude at the receiver, because television sets and the like, sample and control their chroma circuits from the burst signal.

This simple circuit could then correct easily for a very common but heretofore difficult to correct problem; too much or too little color saturation in the demodulated signal. Simply increase the burst, and this would lower the chroma level, and of course, vice versa. Also change its phase or polarity and the results are startling, also a "chroma trap" could be used to insure total *noninterference* of the enhancement process with any *chroma* information.

Further with reference to FIG. 4, L3 and C5 could be resonant at the 3.58 chroma frequencies, and thus is shown a simple way in which the chroma signal can vary the luminance portion of the R.F. carrier out signal, for "video art", or with proper companion circuitry to correct color difficiency of the modulated R.F. signal as mentioned previously.

Previous discussions of picture "detail enhancing" have assumed R.F. modulated signals and base band video signals of the correct time relationship with each other to function properly. Obviously if the base band video signal was to "lead" the modulated R.F. carrier by even a microsecond, then "enhancement" would not occur, but rather a form of "video art" would occur, wherein all fine details (such as wall or door edges) in the picture would be displaced ahead in time, and would in fact produce a "leading ghost" in the picture.

Experiment has found that the circuits such as that of FIG. 3 will enhance R.F. carriers from most video recorders as their signals are timed close enough for enhancement, but some machines have too much "lead" time of the base band video signals for direct enhancement. The simple addition of a small time delay to the base band video signal before it reaches diode D of FIG. 3, "realigns" the find detail elements for enhancement. Simple R-C delays can be used successfully for this delay, provided care is taken in choosing the R-C values and circuit configuration, so as to get the correct phase to the diode D. Also, the delay may be made adjustable to add video art capability at the same time, in the same product.

While on the subject of time and phase, FIG. 3 is now discussed with reference to polarity of signals reaching diode D.

Q2 was added to FIG. 3 to be able to allow selection of either "enhancement" or "dehancement" of the fine detail information of the viewed image. The dehancement function is very useful for tape playback or "live" viewing of pictures that contain a high level of noise or snow. In such cases, enhancement of fine details would only produce a picture that was less pleasing to the eye, while dehancement produces a "softer" picture that is more pleasing to view, and so the addition of Q2 allows the user to adjust for the mode of operation most suited for their needs.

Observation of the circuit of FIG. 3 in operation shows that the "enhancement" position of R10 is when the wiper terminal is adjusted toward the emitter of Q2 and "dehancement" occurs when the wiper is adjusted toward the collector of Q2. This is just the exact opposite of what the adjustment positions might be expected to be, given the standard polarity of negative going sync tips in the incoming base band video signal, but many factors not readily apparent from FIG. 3 are at work in the circuit, so mention is made of the more important ones here.

For enhancement, the higher video frequencies are used, and differing phase shifts for differing frequencies can occur between the base band video input terminal (video output terminal of the VCR) and the junction point of the diode D anode and L1, depending on circuit design. Also, some details are brought out better by "outlining" them with opposite polarity (black against white) edges, rather than just making a black detail blacker, or a white one whiter. A full discussion of what is a more pleasing picture to view, "sharper or softer", and also which particular type of pictures and details in them are best suited for "adding" amplitudes, and which are best suited for outling "opposite" amplitudes is beyond the scope and purpose of this disclosure. Mention is made of them here however, to point out that the electronic parts of the invention represent a "family" of parts, all working together, and interacting to supply diode D with the correct drive signals to achieve the desired results, be it enhancement, dehancement, chroma shifts, video art, or as described next, "sync shifting".

In another embodiment of the present invention circuits such as FIG. 3 of this invention can perform "sync shifting" or time base correction of R.F. signals after they have left the VCR.

Figure 5:
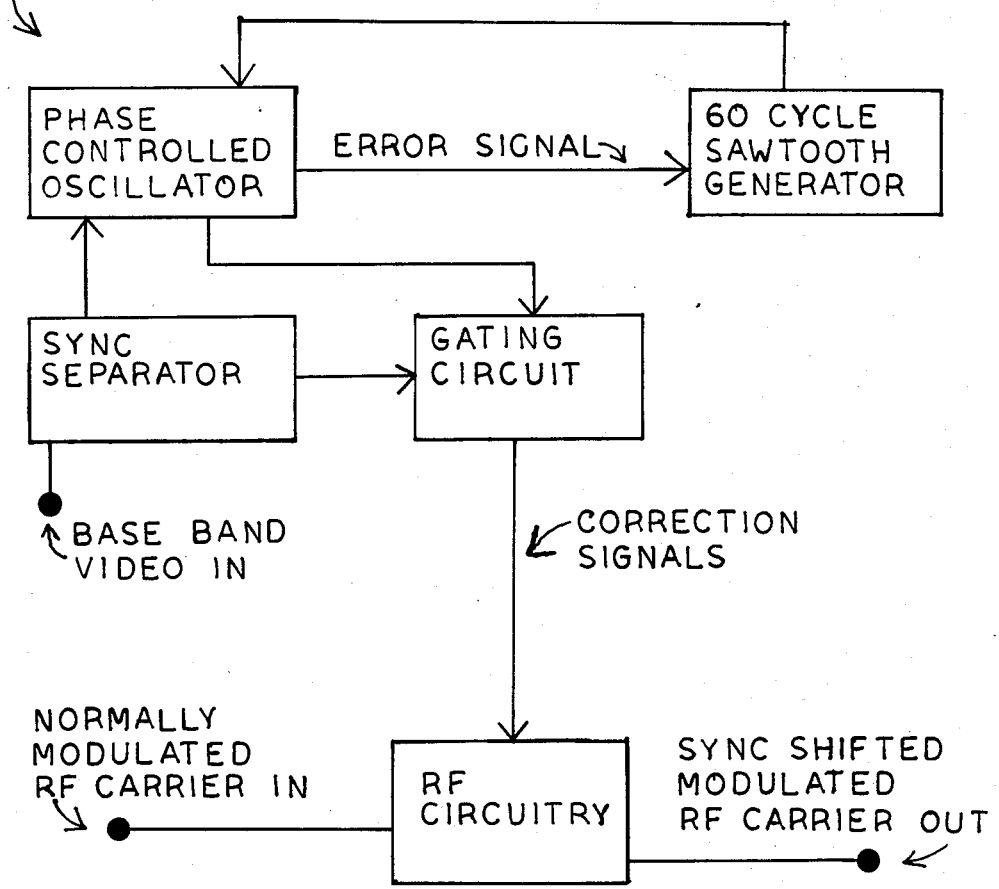
FIG. 5 is a block diagram of another embodiment of the present invention causing a time base correction effect.

Prior art time base correctors cost thousands of dollars and were beyond the reach of the home consumer. A block diagram of a low cost sync shifter is shown in FIG. 5. The sync signal is extracted from the incoming base band video signal and fed to an oscillator that is phase locked at 15,750 C.P.S. A phase detector is incorporated into this oscillator to obtain an error signal to show "line by line" errors in horizontal sync, and thus any sudden changes in horizontal timing produce large error signals.

Sudden timing changes occur at the "head switching point" in helical scan tape machines and are caused primarily by playback tape tension errors, (skew), and by 180 degree tape recorder heads being not *exactly* 180 degrees apart, and/or by not being centered *exactly* about a common center point of rotation (flagging). These errors are sensed for uses as "sync" by a second oscillator which generates a 60 cycle sawtooth to be fed back to oscillator #1, which can then send its new sync pulses to a "gating" circuit, which then feeds the R.F. portion of the circuit the necessary correction voltages to its "diode D", to suppress unwanted or out of time horizontal sync pulses, and reinsert correctly timed horizontal sync.

In brief form, this time base corrector works as follows: Assuming the lowest horizontal frequency encountered is 15,740 C.P.S., and the highest is 15,760 C.P.S. Oscillator #1 averages this out, and runs at a constant 15,750 CPS, thus creating a new "master clock" for reference. All other circuits in this "family" feed diode D with signals so as to shift the sync pulses in the necessary direction to correct the time base errors. Oscillator #2 is given its sync information (60 cycle) by the error signal and/or by base band video.

This particular embodiment does not lend itself to an automatic correction circuit but the system shown in FIG. 5 will straighten out "bent" lines as shown in FIG. 6. The user can then adjust a manual control to remove the "tilt".

Since it is known that a frequency plot of the uncorrected horizontal sync will have a 60 cycle sawtooth shape, it is a simple matter to add an opposing sawtooth to oscillator #1 by manual control.

Of course, this low cost time base corrector could also work on base band video signals, and one method for suppressing existing sync, and reinserting missing or wanted sync into both base band video lines, and R.F. lines, is described in co-pending application Ser. No. 347,339, filed Feb. 9, 1982.

Both flagging and skewing problems (visibly) occur mainly on the older type television receivers, and consequently a very large number of television sets are going to an early obsolescence by VCR owners, in order to stop the annoyance of flagging and skewing.

This embodiment is not a "true" time base corrector in the known sense of the word, but rather a "sync shifter" to obtain the same visable results as a time base corrector, at a greatly reduced cost.

What the circuit actually does, is to misplace or *shift* the sync pulses with respect to the "camera" signal in a direction and by an amount set by the user, so their *particular* T.V. receiver will show straight lines instead of bent ones. Two different television sets of different brand names would very likely require two different settings of the manual controls for the same taped program material. While this embodiment cannot fully correct all errors on all television sets, it will certainly make a big improvement on every one. Even studio equipment that costs thousands of dollars cannot fully correct all time base errors.

The manual controls of the sawtooth correction voltage can include circuitry to modify the shape of the sawtooth and also the "distance" *down* each vertical field it is active, so that the television set will show corrected pictures. This modified sawtooth might include a large initial "pulse" to force the television's A.F.C. circuit to shift more quickly than normal at the "head switching" point of the tape, and then reduce the shift speed. As stated previously, the requirement for correction would vary from television to television set.

FIG. 6 shows a typical "below" television screen as viewed with the picture of, say the center, of perhaps a telephone pole. The top of the picture shows the "bend" (usually to the right) in the picture.

FIG. 6B shows the telephone pole (as viewed) after oscillator #1 "shifts" the horizontal sync, but without the benefit of the correcting sawtooth, (or modified sawtooth), note that the "bend" is now gone, but there is a "tilt". FIG. 6C shows the viewed picture after the user has adjusted the manual controls, it is now straight up and down. Similarly alternate field modifications to the sawtooth correction voltage would correct for "flagging".

In another embodiment of the present invention an audio signal is used to modify the already generated R.F. carrier. This opens a totally new vista of "video art" especially when combined with the various types of processed video signals of the other embodiments disclosed here, or "gated" and combined with the processed video. Such gating may consist of allowing the audio signal to reach diode D only during chroma burst time, or chroma time, or only during "object outline" time of the viewed image, and so on, limited by only the imagination of the user of this invention.

This embodiment may also employ frequency selective circuitry to process the audio signal before its combined and gated, so that for instance as a way of example, only the "base" sounds would gate with "object outline" processed video, and add say, bright white outlines around objects in the viewed image, with each "beat" of a musical song. Thus creating what might be referred to as a "light show" effect, and thus enhance the enjoyment of the viewer. Of course, an audio output jack is also available on home consumer type video recorders.

Circuitry to process the audio should be fairly standard, and so none is disclosed here, and one gating method to block signals from reaching diode D of FIG. 3 is disclosed in co-pending patent application Ser. No. 347,339, filed Feb. 9, 1982.

In another embodiment of the present invention, a "Y" connection is used to feed both the video tape recorder and present invention with the same base band video, and/or audio signals for video art generation of "home made" (as opposed to commercially broadcast) video/audio material. This can be very effective because their is often a time delay between the "video in" jack on the recorder, and its built in R.F. modulator. Also a "Y" cabling system could be used from say a separate R.F. modulator feeding the recorders V.H.F. tuner and the invention from a common "home made" source, for even greater time delays for the video art displays. In "Y" type arrangements, it is easily possible to effect both "forward" as well as "backward" time shifts.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A Radio frequency processing circuit for altering the video modulation characteristics of a previously modulated radio frequency carrier comprising:
    a first input terminal to accept in said previously modulated radio frequency carrier;
    a second input terminal to accept in a base band video signal from which said previously modulated radio frequency carrier obtained its video modulation information;
    a first means for processing said base band video signal, for providing a source of processed base band video signal;
    a second means for altering the video modulation characteristics of said previously modulated radio frequency carrier accepted in at said first terminal; and
    a third means for coupling said processed base band video signal to said second means, so as to instruct said second means as to how to alter the video characteristics of said previously modulated radio frequency carrier.

2. The circuit described in claim 1 wherein:
    said first means includes circuitry to generate the time relationship of sync pulses with respect to a camera signal.

3. A radio frequency processing circuit for altering the video modulation characteristics of a previously modulated radio frequency carrier comprising:
    a first input terminal to accept in said previously modulated radio frequency carrier;
    a second input terminal to accept in a base band video signal from which said previously modulated radio frequency carrier obtained its video modulation information;
    a third input terminal to accept in a base band audio signal from which said previously modulated radio frequency carrier obtained its audio modulation information;

a first means for processing said base band video signal, for providing a source of processed base band video signal;

a second means for combining said processed base band video signal with said base band audio signal, for providing a source of combined base band audio video signal;

a third means for altering the video modulation characteristics of said previously modulated radio frequency carrier accepted in at said first terminal; and a fourth means for coupling said combined processed base band audio video signal to said third means, so as to instruct said third means as to how to alter the video characteristics of said previously modulated radio frequency carrier.

4. A base band video sync shifting circuit to move the horizontal syncronizing pulses either forward or backward in time with respect to their associated camera signal, in order to cause the television receiver displaying said base band video, to display images as though there was less time error in said base band video than the time base error that truly exists in said base band video, comprising:

a horizontal phase controlled oscillator means to provide a vertical rate locking signal;

a second oscillator means operating at the vertical rate to provide a correction signal to be fed back to said horizontal phase controlled oscillator means to intentionally change its phase locking relationship to said base band video at a vertical rate; and means to remove or suppress the original horizontal sync pulses in said base band video, and reinsert new horizontal sync pulses, derived from said horizontal phase controlled oscillator, back into said base band video at a different time relationship from said original horizontal sync pulses.

5. The circuit described in claim 1 wherein: said second means changes the time relationship of sync pulses with respect to a camera signal.

6. A video sync shifting circuit to move the horizontal synchronizing pulses either forward or backward in time with respect to their associated camera signal, in order to cause the television receiver displaying said video, to display images as though there was less time base error in said video than the time base error that truly exists in said video, comprising:

a first means operating at the vertical rate to provide a correction signal for a second means;

a second means operating at the horizontal rate to provide a correction signal for a third means;

a third means to insert new horizontal sync pulses, derived from said second means, into said video at a different time relationship from the original horizontal sync pulses in said video.

* * * * *